United States Patent

Powers

[15] 3,643,280
[45] Feb. 22, 1972

[54] PIPELINE PIGS

[72] Inventor: Marvin D. Powers, 6060 Skyline Drive, Houston, Tex. 77027

[22] Filed: Dec. 19, 1969

[21] Appl. No.: 886,629

[52] U.S. Cl. .................................................15/104.06 R
[51] Int. Cl. ...........................................................B08b 9/04
[58] Field of Search ...........................15/104.06, 104.06 A; 118/DIG. 11

[56] References Cited

UNITED STATES PATENTS

| | | | |
|---|---|---|---|
| 2,188,959 | 2/1940 | Schaer | 15/104.06 R |
| 2,576,197 | 11/1951 | Stephens | 15/104.06 R |
| 2,750,612 | 6/1956 | Ver Nooy | 15/104.06 R |

*Primary Examiner*—Edward L. Roberts
*Attorney*—Michael P. Breston

[57] ABSTRACT

This invention relates to pipeline pigs for removing liquids and solid debris. The pig includes at least one fluid extraction chamber and is propelled through the pipeline under the pressure exerted by a suitable gas which picks up and atomizes the liquids within the chamber. The pig preferably also includes a drying chamber from which liquids are removed through a syphon tube operated by the gas pressure. The gases, together with the extracted liquids, become ejected in front of the moving pig in the direction of fluid flow.

12 Claims, 5 Drawing Figures

Marvin D Powers
INVENTOR

BY Michael P. Breston

ATTORNEY

Marvin D. Powers
INVENTOR

BY   Michael P. Breston

ATTORNEY

PIPELINE PIGS

BACKGROUND OF THE INVENTION

Various pipeline liquid removers and cleaners are known in the art. One such widely used pig includes a pair of rubber cups mounted at each end of a center shaft. The pressure gradient between the upstream section of the pipe and the downstream section of the pipe on either side of the pig forces outwardly the inside lip of each cup into sealing but slidable engagement with the inner cylindrical wall of the pipe. Such pigs may be used for segregating products transported by the pipeline, clearing liquids and, with the aid of suitable cleaning attachments, cleaning the inner wall of the pipeline.

It has been found that while such prior art tools may be adequate for cleaning purposes they are relatively inefficient for clearing and removing liquids from pipelines. For example, it is common practice to test new pipelines under hydrostatic test, it is necessary of course to clear the pipeline of the water prior to feeding hydrocarbon fluids such as combustible gases, oils, gasolines, etc. If such products are sent through an improperly dehydrated pipeline, the products are likely to become rejected by the customer or consumer for containing an excessive amount of moisture. As a result, pipeline operators spend considerable effort in making certain that substantially all of the water in the pipeline has been cleared, prior to allowing the pipeline to carry, for example, hydrocarbon products. But even when great care is exercised in clearing the liquids from the pipeline with known pigs, there is still no assurance that substantially all of the liquids become removed. Pockets and/or films of liquids frequently remain in spaced apart sections of the pipeline, and their existence may only become revealed when the hydrocarbon products become analyzed for their moisture content.

CROSS-REFERENCE TO RELATED APPLICATIONS

The apparatus of this invention is related to the apparatus disclosed in my copending U.S. Pat. application, Ser. No. 816,181 filed Apr. 10, 1969, and assigned to the same assignee.

SUMMARY OF THE INVENTION

The pig of this invention includes at least two transverse stoppers or plugs spaced apart and coupled together to form a "moving" atomization chamber between the plugs. Each stopper has an external peripheral surface provided by a resilient material forming a sealing but slidable engagement with the surrounding cylindrical interior wall of the pipe. The free space between the plugs forms an atomization chamber which admits gas under pressure for atomizing any liquids within the chamber. The atomization chamber may be coupled in series to a drying chamber, which may be conveniently formed by the inner space defined by another plug positioned downstream of and coupled to the front plug of the atomization chamber. Any liquids within the atomization chamber become atomized as the gas flows through the atomization chamber into the drying chamber. The liquids in the drying chamber become lifted by the pressure of the moving gas and ejected in front of the drying chamber in the direction of fluid flow. The liquid gas mixture is expelled in front of the moving pig in a manner as to create a stirring effect which assists in removing debris from the pipeline.

It is a main object of this invention to provide new and improved pigs which are especially effective in removing liquids and solid debris from pipelines;

It is another object of this invention to provide new and improved pigs which effectively dry the inner cylindrical walls of pipelines;

It is yet another object of this invention to provide such pigs which are relatively inexpensive to manufacture and which clear the pipelines of liquids and debris in a relatively short time and in a very economic manner.

BRIEF DESCRIPTION OF THE DRAWINGS

The invention will be illustrated by reference to specific presently preferred embodiments, as shown in the figures, where the same numerals designate similar parts.

Figure 1:
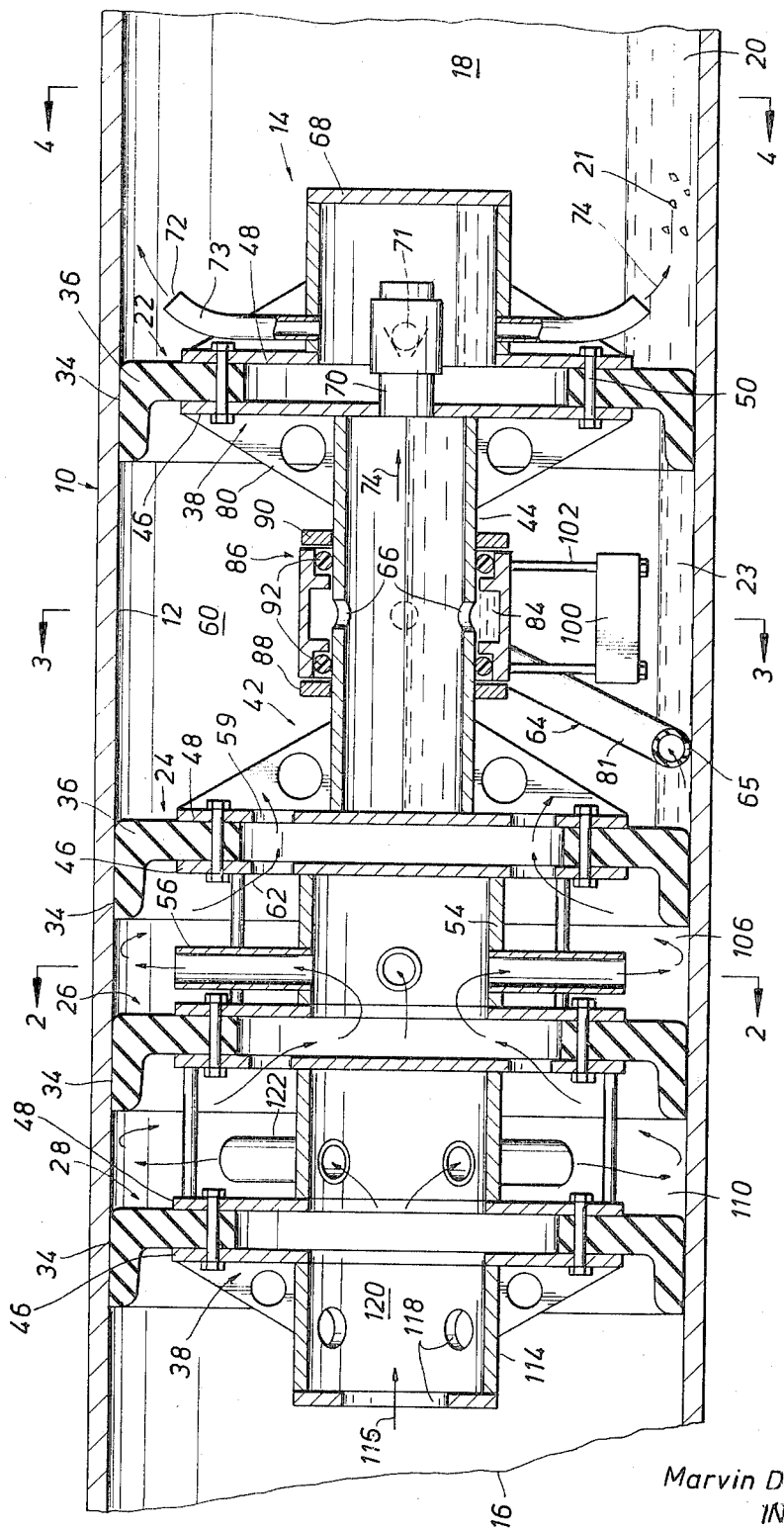
FIG. 1 is a view in longitudinal cross section of a preferred embodiment in accordance with this invention.

The improved pig of this invention is generally designated as 14. It is especially effective in clearing liquids from pipelines. Pig 14 is illustrated as being inside a pipeline 10 having an inner cylindrical wall 12. Pig 14 is propelled through the pipeline by a pressurized gas 116. At any instant of time, pig 14 separates pipeline 10 into an upstream section 16 and a downstream section 18, assuming that the pig moves from left to right as viewed in FIG. 1.

It is the main object of pig 14 to clear liquids, typically water 20 and solid debris 21, from the downstream section 18 through a pipe outlet (not shown) further down the pipeline.

A long pipeline is not usually stretched in a straight line but, on the contrary, has many turns in both lateral and vertical directions. Consequently, it is desirable for pig 14 to continuously maintain a sealing but slidable engagement with the inner cylindrical wall 12. In a preferred embodiment such engagement is afforded by stoppers or plugs, generally designated as 22, 24, 26 and 28.

Figure 2:
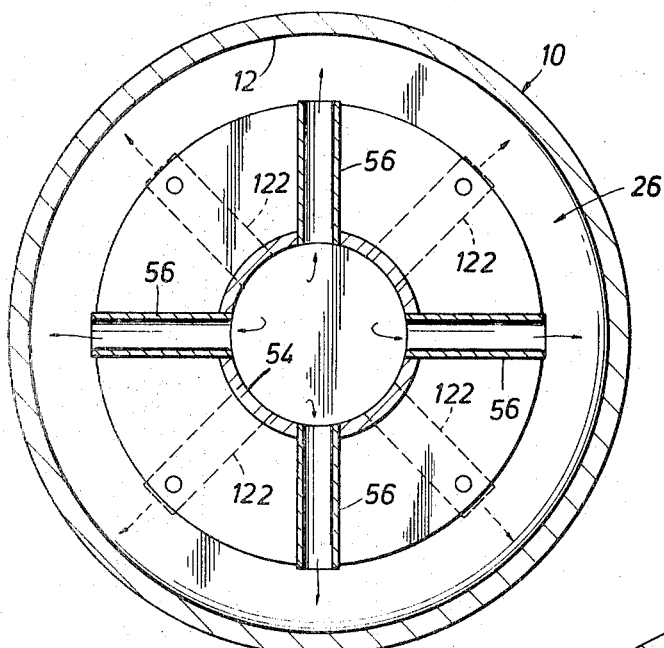
FIG. 2 is a view taken on line 2—2 in FIG. 1.

Each plug acts as a movable piston against which gas pressure is exerted. The plugs can be built of commercially available parts. Each plug provides a deformable wall 34 positioned in sealing and sliding engagement with the inner wall 12 of pipeline 10. Wall 34 can be the peripheral cylindrical wall of a resilient member such as a cup 36 mounted on a suitable rim generally designated as 38. Each rim includes an inner plate 46 and an outer plate 48 held together by bolts 50. To maintain plugs 22 and 24 in longitudinally spaced, parallel alignment there is provided a mechanical coupling assembly, generally designated as 42. Assembly 42 includes a hollow coupling shaft 44 rigidly fastened, as by welding, to rims 38 of plugs 22 and 24. Inlets 59 allow fluid pressure to communicate between the upstream section 16 and a drying chamber 60, formed by the inner volume between plugs 22 and 24. The gases flow into chamber 60 through a center hollow tube 54 and outlet tubes 56, radially extending from tube 54, as better shown in FIG. 2. The flow of gases from tubes 56 into chamber 60 is indicated by arrows 62.

Figure 3:
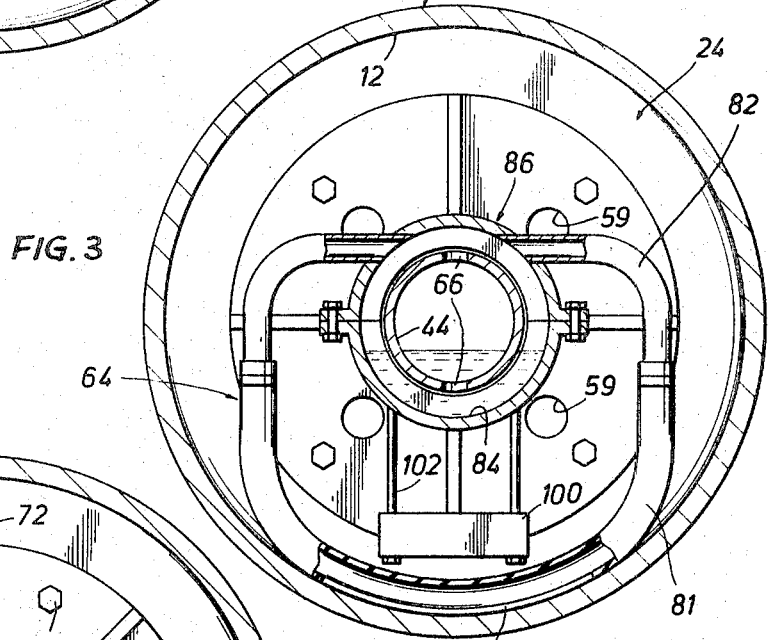
FIG. 3 is a view taken on line 3—3 in FIG. 1.
Figure 4:
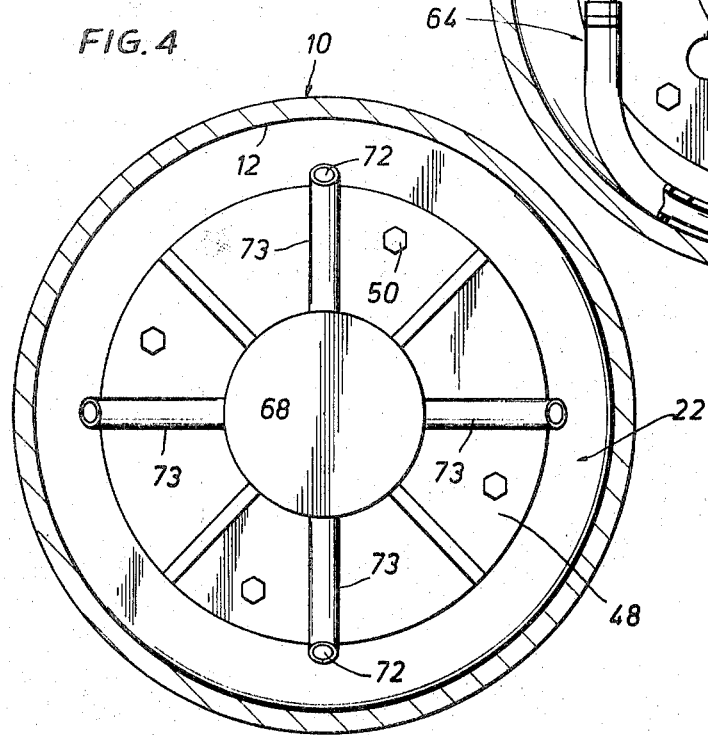
FIG. 4 is a view taken on line 4—4 in FIG. 1.

The fluids from drying chamber 60 are removed by a fluid-pickup, or siphon line 64 which extends (see FIG. 3) from the lowermost portion of the cylindrical wall 12 to a port 66 formed by an opening in the cylindrical wall of hollow shaft 44. Communicating with port 66 and a discharge head 68, which is secured to end plate 48, is a center tube 70 in rim 22. The fluid from discharge head 68 is channeled through a plurality of discharge pipes 73 (see FIG. 4) having oriented nozzles 72 to produce a stirring effect. The path of the fluid or gas-water flow from the drying chamber 60 to the downstream section 18 is indicated by arrows 74. A plurality of reinforcing ribs 80 are provided to strengthen the mechanical coupling assembly 42.

The siphon line 64 is preferably made of a resilient tube 81 coupled to a U-shaped pipe section 82. Siphon line 64 establishes through an opening 65 fluid communication with a swivel chamber 84 formed within a cylindrical swivel assembly, generally designated as 86. Swivel 86 is maintained in axial alignment by a pair of radially extending shoulders 88 and 90. The swivel assembly 86 rotates on the outer cylindrical wall of hollow tube 44 preferably on two teflon bearings 92. To assure that the siphon line 64 will always extend downwardly into whatever liquid pool 23 that may exist in drying chamber 60, assembly 86 is provided with a weight 100, such as lead, bolted by bolts 102 to the outer wall of the swivel 86.

In operation of the portion of pig 14 thus far described, the driving gas 116 establishes the desired pressure gradient across plug 22 thereby propelling pig 14 through pipeline 10. The gas pressure becomes exerted primarily against inner plate 46 of plug 22. The pressure drop or gradient across plug 22 provides the propelling force for pig 14 to clear the liquid pool 20 to a downstream pipe outlet (not shown). Any liquids which bypass the sliding seal wall 34 of plug 22 and enter into the drying chamber 60 to form the liquid pool 23 become lifted by the liquid-pickup, siphon line 64. The lifting of the liquids is based on the pressure in chamber 60 being greater than the pressure in the downstream section 18. A suitable check valve 71 is provided in line 70 to prevent liquids from back-entering into tube 70 and hence into the drying chamber 60. Thus, the driving gas 116 flows from tube 54 through outlets 56 into the drying chamber 60. The fluids (gas-water mixture) from chamber 60 flow through siphon line 64, swivel chamber 84, port 66, tube 44, tube 70, check valve 71, discharge head 68, pipes 73 and nozzles 72 into the downstream section 18.

The orientation of the nozzles 72 is such as to cause a stirring effect on whatever solid debris 21 that may have gathered in the water pool 20. This stirring effect facilitates the removal of the debris by the downstream flow of the liquid pool 20. Since the swivel assembly 86 is weighted, the hollow shaft 44 rotates inside the swivel 86 to assure that the gas-and-water pickup line 64 is always directed downwardly and hence that the opening 65 remains in the liquid pool 23 within the drying chamber 60.

While the swivel assembly 86 is shown as being rotatable on tube 44, it will be appreciated that for some pipeline applications such rotation is not essential. This is particularly applicable to "straight" pipelines. Hence, siphon line 64 may then extend directly into port 66.

The operation of the drying chamber 60 thus far described is essentially similar to the operation of the drying chamber described in said copending patent application.

In accordance with this invention, the inner volume between plugs 24 and 26 forms an atomization chamber 106 for atomizing liquids remaining on the inner cylindrical wall 12 of pipeline 10. Liquid particles become lifted and mixed with the stream of gases flowing from tubes 56 into ports 59, as if they were evaporated. While one atomization chamber may be sufficient for most applications, it is often desirable to provide a second atomization chamber 110 confined between plugs 26 and 28. A hollow center tube 114 allows the inlet gases 116 to enter through openings 118 into a chamber 120 formed inside tube 114. Suitable, radially extending outlets 122, similar to outlets 56, allow gases 116 to flow into the atomization chamber 110 for atomizing the liquid particles remaining on the wall 12.

It will therefore be appreciated that the bulk of the liquids which pass through the front plug 22 become siphoned out by line 64 and discharged by nozzles 72, into the downstream section 18, as previously described. The inner cylindrical wall 12 is first dried by the first atomization chamber 106, which atomizes the liquid particles inside chamber 106. Liquid particles left behind atomization chamber 106 on the inner cylindrical wall 12 are then "super" atomized by atomization chamber 110. Thus the inlet gases 116 "absorb" the liquids from the atomization chambers 106 and 110. These gases are then discharged into the downstream section 18 after lifting the liquids from the drying chamber 60, as previously described.

It will be apparent that when the liquid content within pipeline 10 is not excessive, the drying chamber 60 may be eliminated, and only one or more atomization chambers provided. Then, plug 24 would become the front plug of pig 14 with the gases discharged by outlets 59 or by a discharge head, similar to head 68, which would be mounted on rim 38 of plug 24.

Figure 5:
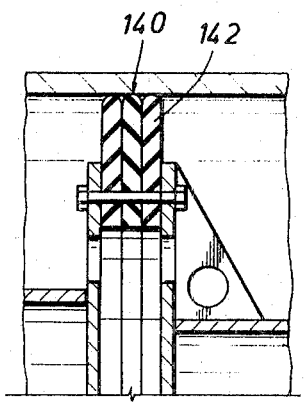
FIG. 5 is a partial view in cross section of another stopper which could be employed in the pig of FIG. 1.

In FIG. 5 is shown a resilient wall 140, formed by annular washers 142, which may be substituted for cup-shaped member 36. Other modifications will become readily apparent to those skilled in the art.

What I claim is:

1. A pipeline pig adapted to become propelled through a pipeline by a fluid pressure gradient comprising:

at least a first plug and a second plug, each plug being adapted to restrain fluid flow thereacross, each plug having a wall formed of resilient material and defining an external peripheral surface, said surface providing a movable seal between said surface and the adjacently surrounding portion of the inner cylindrical wall of said pipe;

coupling means adapted to securely fasten said plugs to each other and to maintain said plugs in longitudinal spaced apart relationship whereby an atomization chamber is defined by the inner volume of said pipe confined between said plugs;

said pig when inserted into said pipeline dividing said pipeline into:

a downstream section in front of said first plug, an upstream section in rear of said second plug, and into said atomization chamber between said plugs;

said coupling means including fluid communication means for establishing fluid communication at least in the direction of fluid flow between said upstream section and said atomization chamber on one hand, and between said atomization chamber and said downstream section on the other hand, whereby said fluid pressure gradient is established for propelling said pig through said pipeline, and any liquids within said atomization chamber become "absorbed" within the gas flow from the upstream section to the downstream section, thereby effectively drying the inner wall of said pipeline:

a third plug, said third plug being adapted to restrain fluid flow thereacross, and having a wall formed of resilient material defining an external peripheral surface, said surface providing a movable seal between said surface and the adjacently surrounding portion of the inner cylindrical wall of said pipeline;

another coupling means adapted to securely fasten said first and third plugs to each other and to maintain said plugs in longitudinal spaced-apart relationship whereby a drying chamber is defined by the inner volume of said pipeline confined between said first and third plugs;

said another coupling means including:

liquid pickup means, and fluid communication means for establishing fluid communication at least in the direction of fluid flow between said atomization chamber and said drying chamber on one hand, and between said drying chamber and said downstream section on the other hand, whereby liquids within said drying chamber become extracted by the gas flow from the upstream section to the downstream section through the liquid pickup means, thereby effectively removing liquids from the drying chamber.

2. A pig adapted to become propelled through a pipeline by a fluid pressure gradient comprising:

at least a first plug and a second plug, each plug being adapted to restrain fluid flow thereacross, each plug having a wall defining an external peripheral surface, said wall providing a movable seal between said surface and the adjacently surrounding portion of the inner cylindrical wall of said pipe;

coupling means adapted to fasten said plugs to each other and to maintain said plugs in longitudinal spaced apart relationship whereby a drying chamber is defined by the inner volume of said pipe confined between said plugs;

said pig when inserted into said pipe dividing said pipeline into:
a downstream section in front of said first plug,
an upstream section in rear of said second plug, and into said drying chamber;
said coupling means including fluid communication means for establishing fluid communication at least in the direction of fluid flow between said upstream section and said drying chamber on one hand, and
between said drying chamber and said downstream section on the other hand,
whereby said fluid pressure gradient is established for propelling said pig through said pipe; and
liquid extraction means responsive to said fluid pressure gradient between said drying chamber and said downstream section for removing liquids from said drying chamber;
said extraction means including:
liquid pickup means for removing the bulk of the liquid from the drying chamber, and
atomizing means for atomizing liquids from the inner walls of said chamber.

3. A pig adapted to become propelled through a pipeline by a fluid pressure gradient comprising:
at least a first plug and a second plug,
each plug being adapted to restrain fluid flow thereacross,
each plug having a wall defining an external peripheral surface,
said wall providing a movable seal between said surface and the adjacently surrounding portion of the inner cylindrical wall of said pipe;
coupling means adapted to fasten said plugs to each other and to maintain said plugs in longitudinal, spaced-apart relationship whereby a drying chamber is defined by the inner volume of said pipe confined between said plugs;
said pig when inserted into said pipe dividing said pipeline into:
a downstream section in front of said first plug,
an upstream section in rear of said second plug, and into said drying chamber;
said coupling means including fluid communication means for establishing fluid communication at least in the direction of fluid flow between said upstream section and said drying chamber on one hand, and
between said drying chamber and said downstream section on the other hand,
whereby said fluid pressure gradient is established for propelling said pig through said pipeline;
liquid pickup means responsive to said fluid pressure gradient between said drying chamber and said downstream section for removing liquids from said drying chamber; and
at least a member coupled with said second plug for defining an atomizing chamber in said upstream section thereby effectively drying the walls of said pipeline,
said member including at least a third plug,
said third plug being adapted to restrain fluid flow thereacross and having a wall formed of resilient material defining an external peripheral surface,
said surface providing a movable seal between said surface and the adjacently surrounding portion of the inner cylindrical wall of said pipeline;
another coupling means adapted to securely fasten said second and third plugs to each other and to maintain them in longitudinal, spaced-apart relationship, whereby said atomizing chamber is defined by the inner volume of said pipeline confined between said second and third plugs;
said another coupling means including another fluid communication means for establishing fluid communication at least in the direction of fluid flow between said upstream section and said atomizing chamber on one hand, and
between said atomizing chamber and said drying chamber on the other hand, whereby
the fluid flow from the upstream section to the downstream section effectively removes liquids from said drying chamber and dries the walls in said atomizing chamber.

4. The pig of claim 3 and further including,
at least another member coupled with said third plug for defining another atomizing chamber in said upstream section thereby effectively drying the walls of said pipeline.

5. The pig of claim 4 wherein said another member includes at least a fourth plug,
said fourth plug being adapted to restrain fluid flow thereacross and having a wall formed of resilient material defining an external peripheral surface,
said surface providing a movable seal between said surface and the adjacently surrounding portion of the inner cylindrical wall of said pipeline;
rear coupling means adapted to securely fasten said third and fourth plugs to each other and to maintain them in longitudinal, spaced-apart relationship, whereby another atomizing chamber is defined by the inner volume of said pipeline confined between said third and fourth plugs;
said rear coupling means including fluid communication means for establishing fluid communication at least in the direction of fluid flow between said another atomizing chamber and said drying chamber.

6. The pig of claim 5 and further including,
fluid discharge means positioned in front of said first plug facing said downstream section to cause the fluids contained in said downstream section in front of said first plug to become stirred up.

7. The pig of claim 6 wherein,
said discharge means include at least one nozzle.

8. The pig of claim 3 and further including,
fluid discharge means positioned in front of said first plug facing said downstream section to cause the fluids contained in said downstream section in front of said first plug to become stirred up.

9. The pig of claim 8 wherein,
said discharge means include at least one nozzle.

10. The pig of claim 2 and further including:
at least a third plug,
said third plug being adapted to restrain fluid flow thereacross and having a wall formed of resilient material defining an external peripheral surface,
said surface providing a movable seal between said surface and the adjacently surrounding portion of the inner cylindrical wall of said pipeline;
another coupling means adapted to securely fasten said second and third plugs to each other and to maintain them in longitudinal, spaced-apart relationship, whereby an atomizing chamber is defined by the inner volume of said pipeline confined between said second and third plugs;
said another coupling means including another fluid communication means for establishing fluid communication at least in the direction of fluid flow between said upstream section and said atomizing chamber, and between said atomizing chamber and said drying chamber.

11. The pig of claim 10 wherein said another fluid communication means include at least one fluid conduit for directing fluid flow against the inner cylindrical wall of said pipeline.

12. The pig of claim 3 wherein said another fluid communication means include at least one fluid conduit for directing fluid flow against the inner cylindrical wall of said pipeline.

* * * * *